(12) United States Patent
Bloechl et al.

(10) Patent No.: US 10,986,467 B1
(45) Date of Patent: Apr. 20, 2021

(54) APPARATUS AND METHOD FOR GEOLOCATING A TAG RELATIVE TO A THRESHOLD VIA PHASE-BASED TIME DIFFERENCE OF ARRIVAL FRAMEWORK

(71) Applicant: Link Labs, Inc., Annapolis, MD (US)

(72) Inventors: Mark O. Bloechl, Elkridge, MD (US); Patrick Li, Potomac, MD (US)

(73) Assignee: Link Labs, Inc., Annapoiis, MD (US)

( * ) Notice: Subject to any disclaimer, the term of this patent is extended or adjusted under 35 U.S.C. 154(b) by 0 days.

(21) Appl. No.: 17/036,128

(22) Filed: Sep. 29, 2020

(51) Int. Cl.
*H04W 24/00* (2009.01)
*H04W 4/029* (2018.01)

(52) U.S. Cl.
CPC .................... *H04W 4/029* (2018.02)

(58) Field of Classification Search
CPC ..... H04W 16/18; H04W 48/12; H04W 48/16; H04W 4/023; H04W 4/80; H04W 74/002; H04W 76/11; H04W 76/15; H04W 84/20; H04W 8/005; H04W 4/024; H04W 4/33
USPC .. 455/41.2, 414.1, 456.1, 442, 456.3, 404.1, 455/509, 434, 450, 522, 83, 446, 502
See application file for complete search history.

(56) References Cited

U.S. PATENT DOCUMENTS

| 7,228,228 | B2* | 6/2007 | Bartlett | G01S 1/08 701/517 |
|---|---|---|---|---|
| 9,253,727 | B1 | 2/2016 | Luna et al. | |
| 9,264,099 | B1 | 2/2016 | Sapio et al. | |
| 9,449,202 | B2* | 9/2016 | Clare | H04W 16/28 |
| 9,652,955 | B1 | 5/2017 | Ray et al. | |
| 9,660,768 | B2 | 5/2017 | Sapio et al. | |
| 9,775,157 | B2 | 9/2017 | Luna et al. | |
| 9,860,882 | B2 | 1/2018 | Sapio et al. | |
| 10,070,479 | B1 | 9/2018 | Ray et al. | |
| 10,182,487 | B2* | 1/2019 | Mohan | H05B 47/19 |
| 10,234,536 | B2 | 3/2019 | Luna et al. | |
| 10,237,913 | B2 | 3/2019 | Wohler et al. | |
| 10,244,373 | B2 | 3/2019 | Bloechl et al. | |
| 10,244,377 | B2 | 3/2019 | Bloechl et al. | |
| 10,264,436 | B1 | 4/2019 | Wohler et al. | |
| 10,484,932 | B2 | 11/2019 | Bloechl et al. | |
| 10,499,196 | B2 | 12/2019 | Bloechl et al. | |
| 10,506,498 | B1 | 12/2019 | Bloechl et al. | |
| 10,708,970 | B2 | 7/2020 | Bloechl et al. | |
| 17,036,128 | | 9/2020 | Bloechl | |
| 10,798,547 | B2* | 10/2020 | Gold | G06Q 30/0226 |
| 10,845,451 | B1* | 11/2020 | Bloechl | G01S 1/024 |
| 10,862,520 | B1 | 12/2020 | Bloechl | |
| 10,873,949 | B1 | 12/2020 | Li et al. | |
| 10,887,860 | B1 | 1/2021 | Bloechl | |
| 2014/0192729 | A1* | 7/2014 | Kim | H04L 5/0042 370/329 |
| 2016/0057565 | A1* | 2/2016 | Gold | H04W 4/80 455/41.1 |

(Continued)

*Primary Examiner* — Joseph Arevalo
(74) *Attorney, Agent, or Firm* — Charles B. Lobsenz; Brian H. Buck; Potomac Law Group, PLLC

(57) ABSTRACT

Provided are a system and method for geolocation of a tag relative to a predetermined threshold based upon receipt of duplicate beacon transmission for a same channel. In response to the duplicate transmission, the tag determines relative phase shift resulting from difference in path length, and evaluates correlation of a highest magnitude phase shift to the absence of any difference in path length to assess proximity of the tag with respect to the aforementioned predetermined threshold.

16 Claims, 12 Drawing Sheets

(56) References Cited

U.S. PATENT DOCUMENTS

| | | |
|---|---|---|
| 2016/0218833 A1 | 7/2016 | Sapio et al. |
| 2016/0323886 A1 | 11/2016 | Luna et al. |
| 2017/0127403 A1 | 5/2017 | Sapio et al. |
| 2017/0153323 A1 | 6/2017 | Luna et al. |
| 2017/0251390 A1* | 8/2017 | Gold .................... G01R 21/133 |
| 2018/0139565 A1* | 5/2018 | Norris .................... H04S 1/007 |
| 2018/0367942 A1 | 12/2018 | Bloechl et al. |
| 2018/0367973 A1 | 12/2018 | Bloechl et al. |
| 2018/0368206 A1 | 12/2018 | Wohler et al. |
| 2019/0124474 A1 | 4/2019 | Bloechl et al. |
| 2019/0159109 A1* | 5/2019 | Bloechl ................ H04W 64/00 |
| 2020/0028530 A1* | 1/2020 | Shapira .................. H03L 7/099 |
| 2020/0113006 A1* | 4/2020 | Bloechl .................. G01S 1/753 |

\* cited by examiner

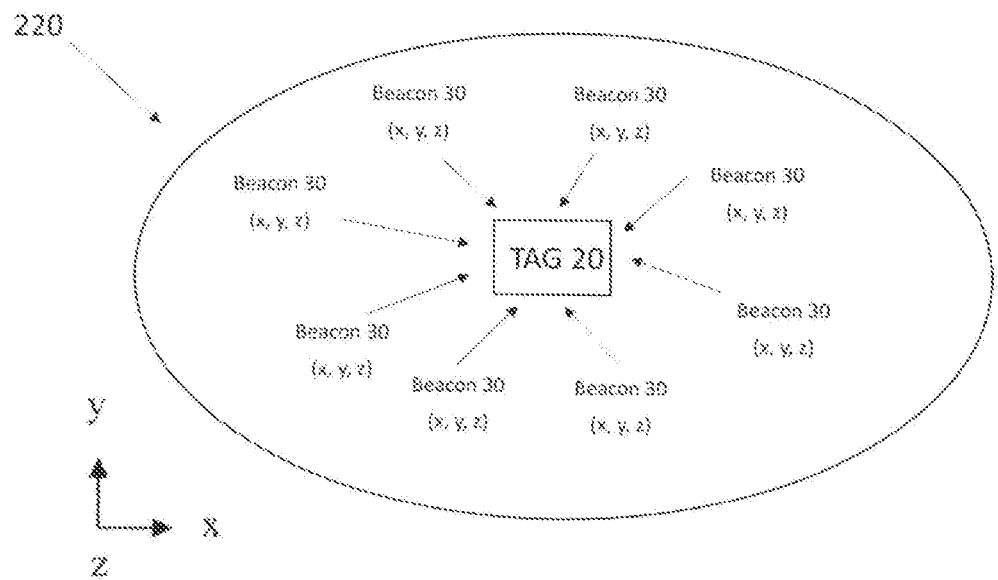
FIG. 2
FIG. 2A
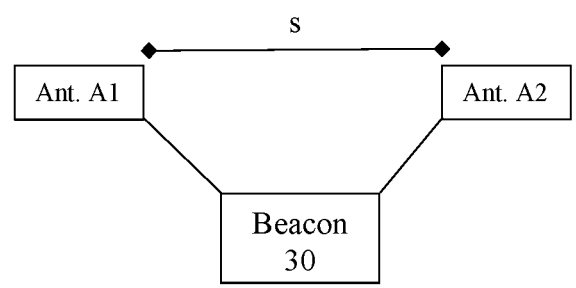

WAREHOUSE LOADING DOCK 46

DRIVEWAY 48

TH

LOADING DOCK DOOR 50

Hallway

Hallway

APPARATUS AND METHOD FOR GEOLOCATING A TAG RELATIVE TO A THRESHOLD VIA PHASE-BASED TIME DIFFERENCE OF ARRIVAL FRAMEWORK

FIELD OF THE DISCLOSURE

Disclosed embodiments relate to wireless communications systems and the operation thereof, and more specifically, to geolocation of one or more wireless communications nodes, such as tags, based upon a time difference of arrival (TDOA) framework that analyzes phase of signal transmissions to be processed thereby to determine such geolocation relative to a threshold.

BACKGROUND

Many different applications exist which require the physical location of objects to be determined and/or tracked over time. Examples include asset tracking solutions such as those deployed in hospitals, warehouses, manufacturing facilities and construction locations. Other solutions involve the tracking of people such as in assisted living facilities or various work environments where knowing the physical location of people over time and/or at the current moment is an important characteristic of overall performance.

These applications, often referred to as "Real Time Location Systems" or "RTLS", are used in any number of scenarios in which the location of one or more physical objects are tracked over time. Typically, the objects being tracked are "tagged" with small wireless capable tags that are attached to the object(s) being tracked. These tags are ideally low cost and transmit using a low power protocol such as Bluetooth or Bluetooth Low Energy (BLE).

Object tracking applications are typically implemented using a user interface which shows the location of the tags in real time in graphical form or via some other reporting format. Location determination of the tags as they move around may be accomplished via various ranging techniques in which the distance between the tag and one or more system components (herein generically referred to as a "beacon") is determined. The RTLS generally require use of multiple beacons when arriving at the location determination(s). These locations are collectively used to calculate a real time geographical position for the tag, and thus a position for the object(s) being tracked as a result of being attached to or otherwise in the immediate physical vicinity of the tag.

In some RTLS systems, one or more beacons "advertise" their presence via periodic wireless transmissions and when a location determination is required, a predetermined handshaking process occurs between the tag and the beacons after the tag undertakes determination of ranging to a respective beacon or beacons and its location determination based thereon. Alternatively, other RTLS systems function such that the tag instead advertises its presence to the beacon and initiates the handshaking protocol when a location determination is required.

As one might imagine, accurate location determination for objects in these RTLS systems is directly dependent on the accuracy of the ranging values calculated between the tags and each of the beacons. In some systems, a minimum of four (4) beacon-tag ranges is preferred in order to establish a confident geographic coordinate for the tag. If even one of the ranges calculated diverges even minimally from the actual value, the location estimation for the tag can be unusably inaccurate. By way of example, in a hospital environment, while it may not be a requirement to know exactly where in the room a specific piece of equipment is located, at least knowing which room the equipment is in would typically be a minimum requirement. If ranging error is significant enough, the wrong room for a piece of equipment could be reported.

Ranging errors can be caused by a number of factors including environmental conditions such as noise, multipath channel effects, clock synchronization and sampling artifacts. Time synchronization and frequency accuracy, or lack thereof, as between the tag and the beacons, can significantly affect ranging accuracy because of the high rate of radio wave propagation. As a result, even small timing errors can cause very significant ranging errors.

Even with the above, perhaps the most significant source of ranging errors results from interference due to the collision of transmissions on the same frequencies. In many cases, an RTLS deployment in an industrial, office or even residential environment will necessarily have to co-exist with other RF systems which transmit on the same frequencies as are used by the RTLS system. For example, the multitude of devices operating on WiFi networks will often interfere with the beacon-tag transmissions since both often operate, at least to some degree, in the same unlicensed spectrum.

Whereas in a case in which Time of Arrival (TOA) may be used to assess send and receive timing of transmissions, Time Difference of Arrival (TDOA) may likewise be used. In the case of TDOA, however, such transmissions may be evaluated solely with respect to the times at which such transmissions are received by the tag.

Yet, accuracy of TDOA analysis is heavily reliant upon resolution of a multitude of timing receipts as to signaling transmissions. As such, processing speed may be slowed, and relatedly, processing capacity and power consumption on a device such as a tag may be unduly burdensome.

Thus, it would be desirable to provide one or more RTLS systems and related operating characteristics that address and overcome the aforementioned impediments and disadvantages now associated with the RTLS systems described hereinabove. More specifically, it would be desirable to provide such functionality in connection with various application environments such as in the cases where RTLS may be deployed to provide any or all of the following: proximity sensing, alert systems, jobsite and warehouse asset monitoring, tracking assets to be inventoried and for which location must be determined, as well as many others.

In particular, it would be desirable to provide therefor enhanced accuracy in ranging and geolocation capabilities in these RTLS systems through various techniques and systems as disclosed herein and in which known impediments to such ranging accuracy and geolocation can be largely overcome such as through the mitigation of the amount of calculation and resultant power consumption which has regularly been necessary when using conventional TDOA analysis.

As an adjunct to such aforementioned enhancement in geolocation capability, it would further be desirable to detect, with particularity, the proximity of an object that has been tagged relative to a given threshold. Specifically, such proximity might include measurement of whether the object is, for example, either approaching, stationed at, or departing from the threshold.

As can be appreciated, knowledge of such proximity may be extremely useful in any number of the application environments discussed above, and carries with it either monetary or non-monetary import.

In a first instance of monetary import, for example, knowledge of whether particular inventory is on schedule to depart a warehouse represents extremely useful information impacting operational aspects such as delivery scheduling and order fulfillment. That is, it may be crucial to satisfying customer needs and desires to know whether a particular item of inventory has reached a level of preparation enabling it to be delivered as promised.

In a second instance of non-monetary import, for example, knowledge of whether personnel and/or clientele, such as those in assisted living facilities, may have traversed an area or areas of such facilities at a scheduled time furthers the delivery of intended assistance and caretaking.

Thus, in these and other application environments, it would be useful to substantially pinpoint tracking of objects intended to be tracked, and to do so relative to a given threshold having importance to the environment and therefore the commercial and/or non-commercial purposes for which such environment exists.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An embodiment may include a system, including at least one tag, and at least one beacon. The at least one tag and the at least one beacon may be configured to engage in wireless communications in a given space and across channels of a given frequency band, in which the at least one tag receives transmissions of at least one Constant Tone (CT) from said at least one beacon on a same channel and for each of the channels, and in response to the receipt of the transmissions of the at least one CT, the at least one tag may be configured to determine, based on one or more shifts in phase corresponding to the transmissions, proximity of the at least one tag relative to a predetermined threshold disposed within the given space.

Another embodiment may include a method, including disposing at least one tag in a given space; and disposing at least one beacon in the given space. The at least one tag and the at least one beacon may be configured to engage in wireless communications in a given space and across channels of a given frequency band, in which the at least one tag receives transmissions of at least one Constant Tone (CT) from the at least one beacon on a same channel and for each of the channels, and in response to the receipt of the transmissions of the at least one CT, the at least one tag may be configured to determine, based on one or more shifts in phase corresponding to the transmissions, proximity of the at least one tag relative to a predetermined threshold disposed within the given space.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein:

FIG. 2 is an illustration of an area configuration of beacons relative to which a tag may determine its coordinate location relative to such beacons according to embodiments herein;

FIG. 2A is a schematic diagram illustrating a beacon according to embodiments herein wherein the beacon is configured with a plurality of antennas from which a beacon advertisement message may be transmitted from each thereof;

DETAILED DESCRIPTION

Figure 1:
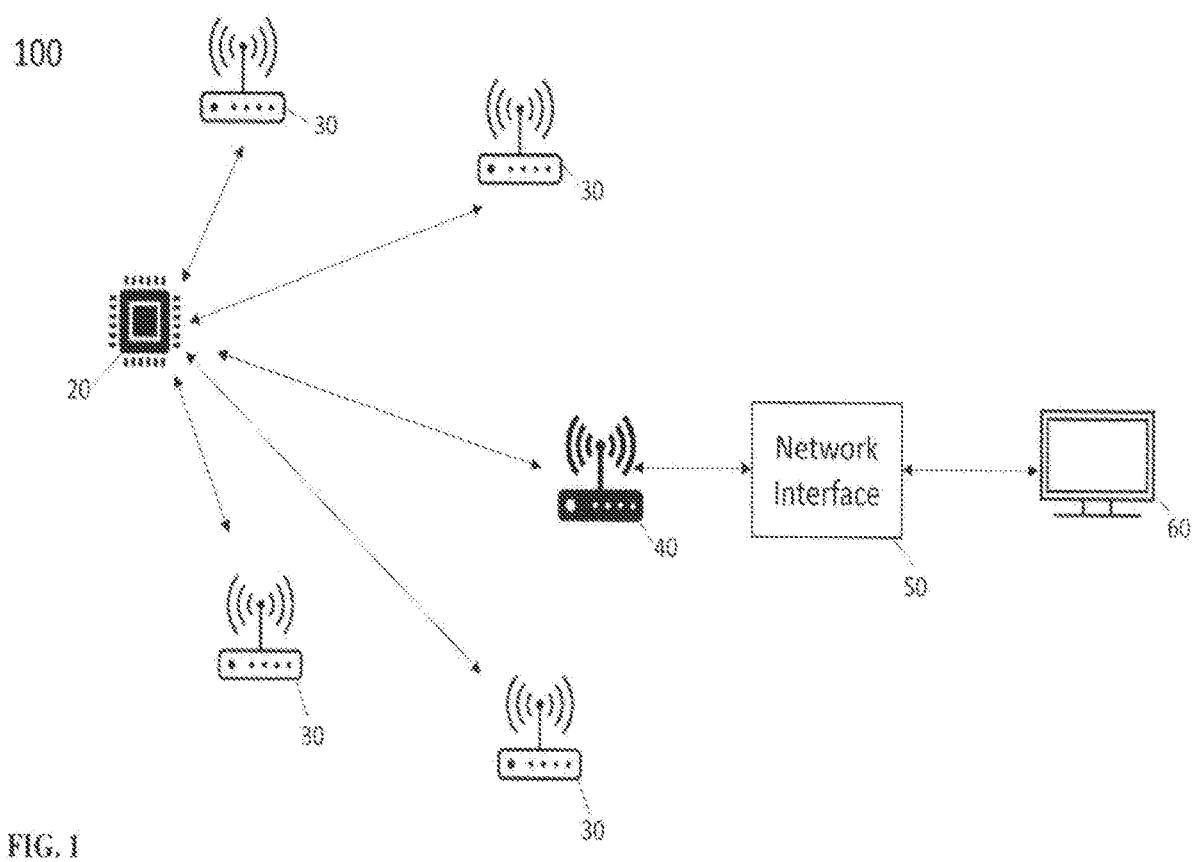
FIG. 1 is an illustration of a network providing location determination functionality in accordance with embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

While embodiments herein are described in the context of a BLE network, the teachings are not necessarily limited thereto. Other wireless network protocols may also be used to provide location determination functionalities while still obtaining the benefits of the present embodiments. Turning now to FIG. 1, a description of the system 100 according to an embodiment is provided.

System 100 typically includes multiple tags 20—only one is shown in FIG. 1 for clarity. Tag 20 may, in one embodiment, comprise a BLE tag which may be attached to or associated with a particular object for the purposes of tracking the location of that object. Tags 20 are capable of wirelessly communicating with other components of system 100 as more fully described herein. System 100 also includes a plurality of beacons 30 which also communicate wirelessly with other components of system 100 such as with tags 20. Beacons 30 are located at very specific geographic coordinates within the area within which objects are to be tracked. Beacons 30 are installed in these locations and during the time of installation, their specific locations are entered into system 100 so that system 100 is always aware of the known exact physical locations of each such beacon 30.

System 100 may also include one or more access points 40. These access points may also serve in the same capacity as beacons 30 in that their location is known to system 100 and such that they may communicate with tags 20 as described herein for the purpose of location determination as more fully described herein. In addition, access points 40, if present, also provide a connection to network interface 50 which permits data to be shared with and received from other networks such as the internet. This functionality may alternatively be provided by one or more beacons 30 in lieu of access point 40. In one embodiment, data is transmitted and received via backhaul to the internet such that a cloud based application may be accessed by a user via client 60 to view object location information and also to allow the user to configure various aspects related to the functionality of system 100.

Tags 20 are responsible for executing the location determination process locally and then reporting the location determination to system 100 via a communication to an access point 40 (or a beacon 30).

With reference now to FIG. 2, a description of the communication protocol by and between tag 20 and beacons 30 within system 100 and according an embodiment is provided. In particular, such protocol may include single antenna transmission of a beacon advertisement message from a respective beacon 30 for receipt by the tag 20. Alternatively, such beacon advertisement message may emanate, as later discussed, from a plurality of antennas corresponding to the aforementioned, respective beacon 30. Accordingly, tag 20 may be configured to interact with beacons 30 to receive BLE communications in connection with making a real time location determination for the tag 20. In doing so, beacon advertisement messages from the beacons 30 may be characterized by Constant Tone (CT), i.e., Continuous Wave Tone. The CT may be at, for example, the carrier frequency or an offset of 250 kHz, and be transmitted at 1 MHz intervals across all 37 channels of the BLE band that are available for data transmission. Such CT may be incorporated with all beacon 30 transmitted messages, and may be sampled by each tag 20 in IQ, or quadrature, format for each channel. That is, such sampling may be understood wherein I represents the amplitude of an in-phase carrier, and Q represents the amplitude of the quadrature-phase carrier. As to others of channels dedicated to solely advertising, an IQ sample may be interpolated from neighboring channels. Accordingly, CT sampling for the entirety of the BLE band may be obtained.

It will be understood that each of the tags 20 and beacons 30 may be equipped with all of the necessary hardware and/or software necessary for executing processing thereof, including that of the aforementioned CT enabled BLE messaging, as well as the IQ sampling in connection therewith that is to be executed by the tag 20.

With reference to FIG. 2, tag 20 (or Node B as referred to in the equations below) may perform a scan within setting/ space 220 to detect those beacons 30 (or Nodes A as referred to in the equations below) that are enabled to transmit the CT, as will be identified by encoding within a respectively transmitted and received beacon advertisement message. Upon detection of such enablement, tag 20 awaits receipt of one or more CT enabled data packets transmitted from an associated antenna of the beacon 30. Here, the data packets may include information pertaining to the initiation of the BLE connection according to BLE protocol, and which enables coarse synchronization to within about 250 ns. Such information may include position data defined as a coordinate position of beacon 30 according to the coordinate of one or more associated antennas, manner of setting low-noise amplifier (LNA) gain enabling the tag 20 to lock its automatic gain control (AGC) circuitry based on the received signal strength (RSS) of a respective data packet, frequency hopping coordination, and phase correction for an associated antenna, etc. In particular, the CT may generally be described by the following:

$$e^{j(\omega_A + \varphi_A)}, \text{ in which}$$

e is Euler's number,
j is the square root of −1,
$\omega_A$ is the angular frequency of beacon 30's signal, and
$\varphi_A$ is an arbitrary phase shift of beacon 30's signal.

The CT is received by tag 20 as the following:

$$e^{j(\omega_A t + \varphi_A + \varphi_{AB}(f,r))}, \text{ in which}$$

$\varphi_{AB}(f,r)$ is the phase shift introduced during propagation, given as a function of frequency (f) and range (r) by $\varphi(f,r) = -2\pi f r/c$, where c is the speed of light.

Figure 2B:
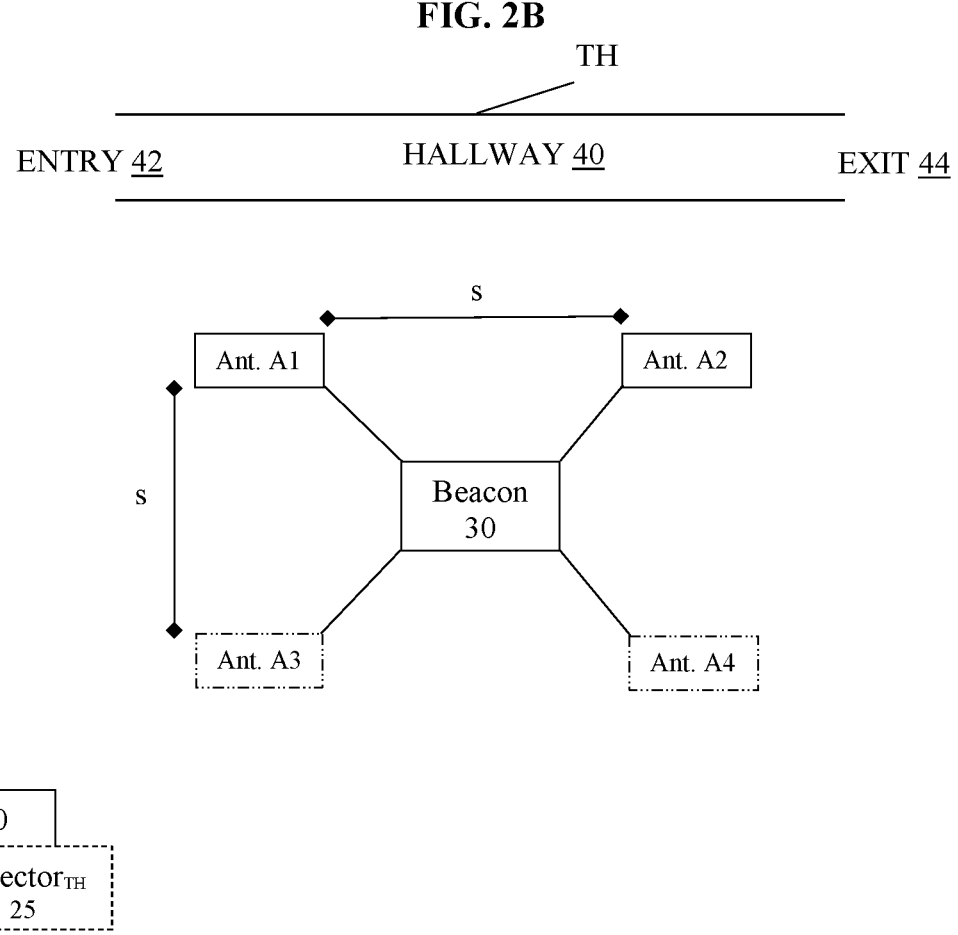
FIG. 2B is a schematic diagram illustrating a beacon similar to that of FIG. 2A wherein the beacon is configured with a plurality of antennas from which a beacon advertisement message may be transmitted from each thereof, and in which the tag is further configured with a threshold detector so as to detect traversal of the tag relative to a pertinent threshold disposed relative to the plurality of antennas, as may be positioned in a hallway, for instance.
Figure 2C:
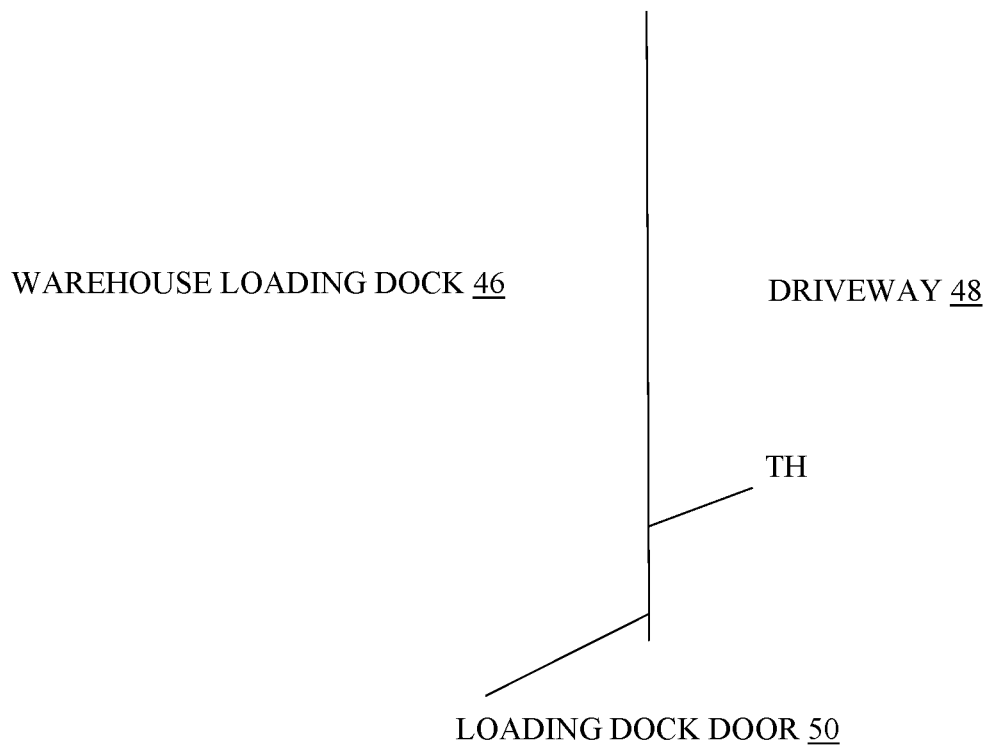
FIG. 2C is a schematic diagram illustrating a beacon similar to that of FIG. 2A wherein the beacon is configured with a plurality of antennas from which a beacon advertisement message may be transmitted from each thereof, and in which the tag is further configured with a threshold detector so as to detect traversal of the tag relative to a pertinent threshold disposed relative to the plurality of antennas, as may be positioned in a warehouse setting.
Figure 2C:
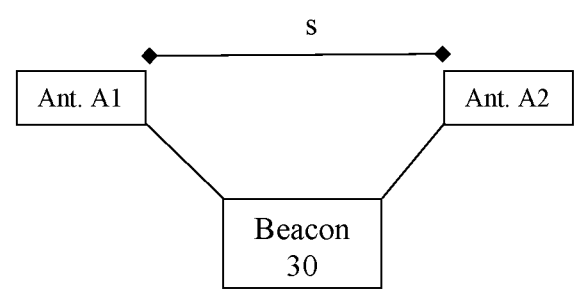
Figure 2C:
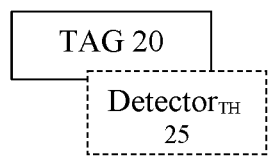

As described above, each beacon 30 may be configured to transmit its CT via a single antenna. However, embodiments herein further contemplate that a respective beacon 30 be equipped with a plurality of antennas for the same purpose, i.e., transmission of the beacon 30 CT. For example, a respective beacon 30 may be configured to include switching capacity to alternate signaling in a predetermined order or sequence among, optionally, a plurality at least two (2) or more wired or wireless antennas A1 and A2, as are shown in FIGS. 2A and 2C. As another example, a respective beacon 30 may be configured to include switching capacity to alternate signaling in a predetermined order or sequence among, optionally, a plurality of at least four (4) or more wired or wireless antennas A1-A4, as are shown in FIG. 2B. As will be understood the aforementioned plurality may define any number of antennas as are suitable for intended broadcast coverage. The beacon 30 may comprise a transmitter commonly connected to such beacon 30 antennas at an exemplary, predetermined spacing s therefrom, as is shown in FIGS. 2A-2C. Transmissions according to each antenna may be scheduled based on a predetermined sequence via the aforementioned switching. Optionally, the predetermined sequence may include switchably activating or deactivating transmission to one or more of antennas A1-A4. In this way, the beacon 30 may mimic the CT transmitting capability of at least a same number of beacons 30 corresponding to the number of connected antennas, while also providing for phase coherence therebetween. That is, in a case in which the beacon 30 includes two (2) connected antennas, the beacon 30 may mimic the transmitting capability and maintain phase coherence of transmissions from a pair of otherwise separated beacons 30 each characterized by single antenna transmission. Thus, whereas the coordinate location of each antenna may then be known to the tag 20 based on receipt of the one or more initial data packets, it may receive the CT corresponding to that antenna and its coordinate location for analysis of a respectively transmitted beacon advertisement message as discussed hereinbelow. As will be further discussed hereinbelow in connection with the aforementioned switchable activation and deactivation of one or more of the beacon 30 antennas A1-A4, the tag 20 may further include a threshold detector$_{TH}$ 25 to detect proximity relative to a threshold as the tag 20 traverses a given path (see FIGS. 7A-7C).

After coarse timing and frequency synchronization between the tag 20 and the beacon 30 (based upon the initially received one or more data packets), the tag 20 may then proceed to hop with the beacon 30 across the 2.4 GHz ISM (Industrial, Scientific, and Medical) frequency band, and sample the CT transmitted at each hop from each beacon 30 antenna. Samples collected by the tag 20 after hopping across all channels of the band are stored by the tag 20 according to channel, i.e., phase/frequency, order for each received antenna transmission. In this way, the CT samples are matched according to channel and antenna categorization(s).

Relative to a configuration in which the beacon 30 is equipped with at least four (4) spatially separated antennas A1 through A4, one of ordinary skill in the art will appreciate, therefore, that six (6) antenna pairs are provided as A1-A2, A1-A3, A1-A4; A2-A3, A2-A4; and A3-A4.

In these regards, stored IQ CT samples Zn for exemplary antennas A1 and A2 for a given channel may be defined as below, in which j represents the square root of −1, $\omega_{tx}$ and $\omega_{rx}$ respectively represent angular frequencies of the transmitter (or beacon 30) and receiver (or tag 20), $\varphi_1$ and $\varphi_2$ respectively represent phase due to path length from, for example, antennas A1 and A2 to the tag 20; and $t_0$ and $t_1$ respectively represent differing IQ sample capture timing, such that:

$$Z_1 = e^{-j\omega_{rx}t0} \times e^{-j(\omega_{tx}t0+\varphi1)}; \text{ and}$$

$$Z_2 = e^{-j\omega_{rx}t1} \times e^{-j(\omega_{tx}t1+\varphi2)}.$$

In the context of traditional TDOA, the position data corresponding to each of the antennas A1 through A4 may be used to determine the intersection of corresponding hyperbolas that yield the coordinate location of the tag 20.

However, in embodiments herein and to improve the accuracy with which the coordinate location of the tag 20 may be determined, either while stationary or while in transit between locations, the traditional framework of TDOA analysis may be adapted to specifically assess a difference in phase as between transmissions of pairs of antennas A1 through A4, based on the difference in RF path lengths of their respective signaling. In other words, the difference in RF path lengths correlates directly to the relative difference in phase of signaling transmitted by each of the antennas when compared to another thereof.

Thus, with reference to antenna pair A1-A2, as an example and understanding that all such other aforementioned antenna pairs may be similarly compared and processed as hereinafter described, tag 20 may conjugate (*) and multiply IQ samples corresponding to each of antenna A1 and antenna A2 in accordance with the following:

$$Z_1 \times Z_2^* = (e^{-j\omega_{rx}t0} \times e^{-j(\omega_{tx}t0+\varphi1)}) \times (e^{j\omega_{rx}t1} \times e^{j(\omega_{tx}t1+\varphi2)})$$

$$= (e^{j\omega_{rx}t\Delta} \times e^{j\omega_{tx}t\Delta} \times e^{j(\varphi2-\varphi1)}) \approx e^{j(\varphi2-\varphi1)} \approx PS, \text{ for } t_0 \approx 0.$$

In doing so, phase differential between respective antenna A1 and antenna A2 samples $Z_1$ and $Z_2$ may be negated such that PS represents, for each of the antenna A1 IQ samples $Z_1$ and antenna A2 IQ samples $Z_2$ as to channels across the BLE band, a phase measurement sample defining the phase shift for signaling as between antenna A1 and antenna A2 due to respectively different paths of that signaling for a given, i.e., same, channel.

A window according to, for example, Hanning or Blackman-Harris, may then be applied to the PS samples, which may then be zero padded to reach a power of two (2), nominally 128. Thereafter, an Inverse Fast Fourier Transform (IFFT) may be performed with respect to the PS samples for each channel spanning the BLE band, in accordance with IFFT bin spacing in meters defined by $$\frac{c}{N \times f_\Delta},$$

where c is the speed of light in meters, N represents the number of points in the IFFT, and $f_\Delta$ represents the spacing of the CTs in each transmitted beacon advertisement message.

Figure 3:
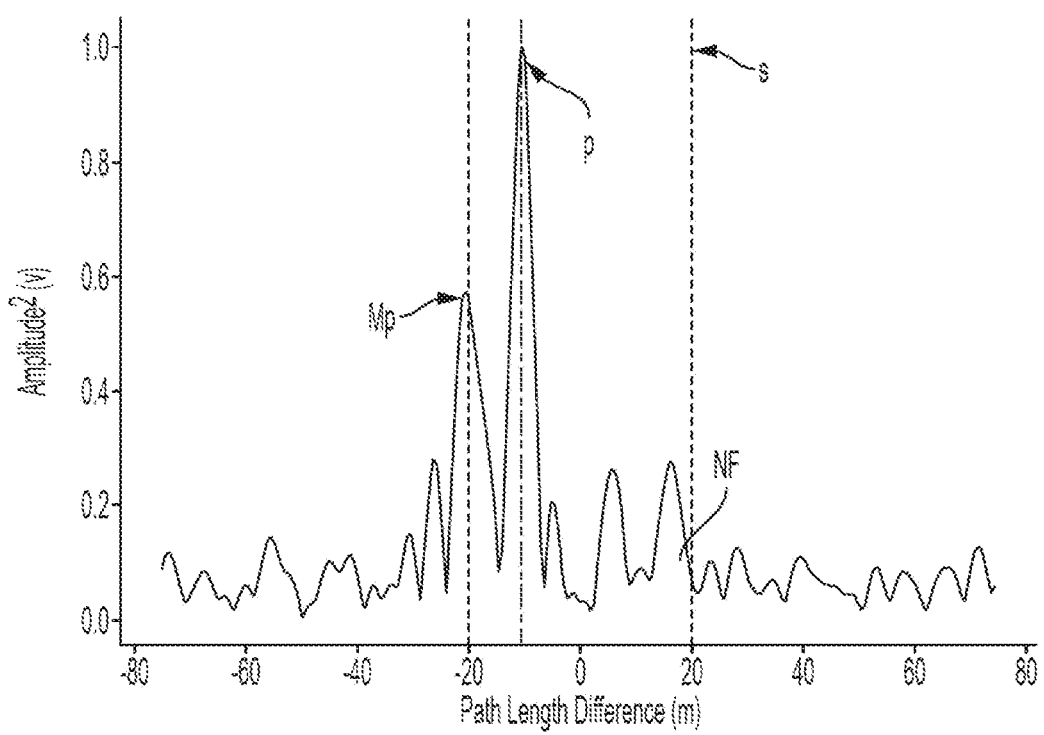
FIG. 3 is a graph illustrating a range difference correlation due to radio frequency (RF) path difference as between signaling of each of a pair of antennas according to either FIG. 2B or FIG. 2C.

For phase measurement samples PS as between antenna A1 and antenna A2, a range difference correlation curve (RDCC) may be derived, as shown in FIG. 3, that plots amplitude squared (in volts) versus a difference in path length (in meters). A peak value (p), in the absence of multipath propagation, or when low multipath propagation may be experienced, may then be demonstrated for use in determining the differential distance in paths of signaling transmitted by antenna A1 and antenna A2. In this regard, the value of the peak p defining the differential distance may be correlated according to the following path length difference (PLD):

PLD=(p*c)/(IFFT_LEN*CH_SPACING), in which p is the peak of the IFFT, c is the speed of light, IFFT_LEN is the number of samples in the IFFT, and CH_SPACING is the BLE channel spacing in Hz (nominally 2 MHz). Thus, based upon the IFFT peak value p, a true value of the path length difference PLD between antenna A1 and antenna A2 may be correlated.

Here, it may be seen that the IFFT peak p, or highest magnitude phase shift, may be approximately 0.98 $v^2$, and which correlates to a true path length difference PLD between signaling of each of antenna A1 and antenna A2 to the tag 20 of about 12 m. The peak p may be referenced with regard to the observed noise floor (NF), i.e., the sum of all noise sources and unwanted signaling. Furthermore, for a predetermined amount of antenna separation s (based upon configuration of the beacon 30), escalations in PS (likely resulting from multipath propagation) may be discarded or ignored as being representative of the peak p. This is the case since it is impossible for a true value of path length difference PLD, as represented at the peak p, to be in excess of the given amount of spatial separation between antennas of a given pair thereof. Thus, with reference to FIG. 3, for a given separation s of 20 meters between antenna A1 and antenna A2, the first demonstrated peak, or multipath peak Mp, may be ignored as being representative of the true path length difference PLD as between antenna A1 and antenna A2. Diagramatically, this may be seen as the multipath peak Mp falls outside the PLD range −20 meters to 0 meters (whereby zero represents the observation that the tag 20 is equidistant from each of antenna A1 and antenna A2).

Figure 4:
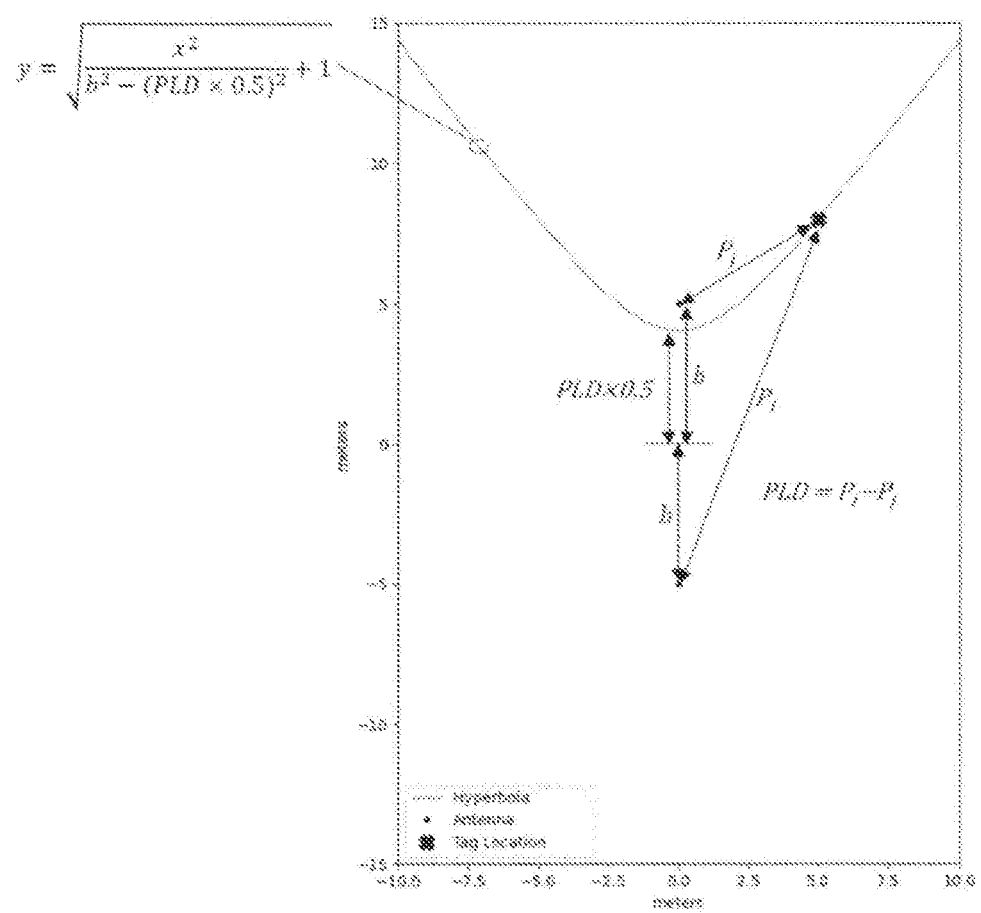
FIG. 4 is a schematic diagram illustrating a determination of a coordinate location of a tag that has received a beacon advertisement message from each of at least a pair of antennas according to, for example, either FIG. 2B or FIG. 2C, based upon respective position data of the antennas and an analysis of a shift in phase due to differing path lengths of transmissions of each of the respective beacon advertisement messages.

In referring to FIG. 4, there is illustrated the curve depicting the RDCC of FIG. 3 as to, for example, antennas A1 and A2 wherein, as discussed above, the RDCC is based upon the phase shift PS between such antennas due to differences in their respective RF path lengths to the tag 20. Specifically, the curve may be obtained, as will be understood by one of ordinary skill in the art, via regression or conversion of the constant PLD of the RDCC, i.e., the argmax [RDCC], so as to be given by $$y = \sqrt{\frac{x^2}{b^2 - (PLD \times 0.5)^2} + 1},$$

wherein b represents one-half of the separation distance s between a given pair of antennas among antennas A1 through A4, the path length difference PLD is given by difference in paths $P_i$–$P_j$, and (PLD×0.5) describes the axis relative to difference in paths $P_i$–$P_j$.

Figure 5:
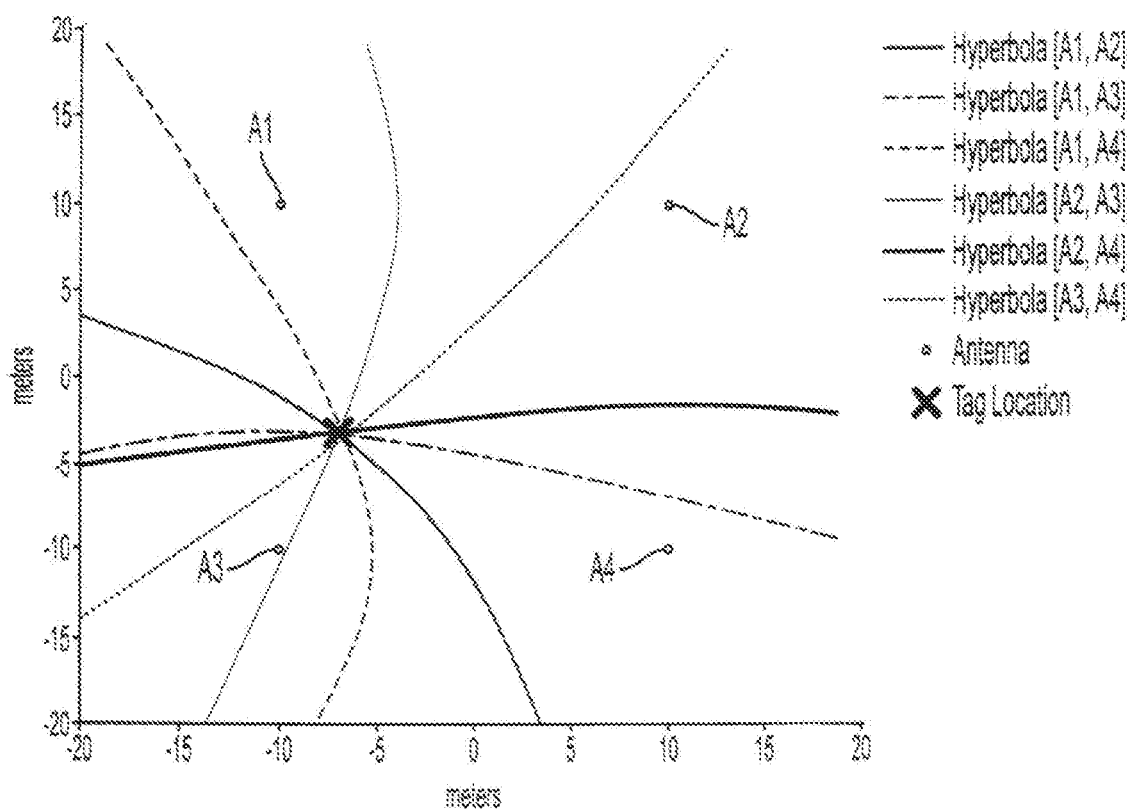
FIG. 5 is a schematic diagram illustrating a determination of a coordinate location of the tag in accordance with receipt of beacon advertisement messages from the entirety of the plurality of antennas of FIG. 2A, for example, based upon respective position data of each of the antennas and an analysis of a shift in phase due to differing path lengths of transmissions of each of the respective beacon advertisement messages.

As will be appreciated, tag 20 may generate for each respective RDCC corresponding to antenna pairs A1-A2, A1-A3, A1-A4; A2-A3, A2-A4; and A3-A4, the applicable hyperbola, as is shown in FIG. 5. In this way, tag 20 generates, via gradient descent, a relative coordinate mapping of its location within space 220 that is defined by the intersection of the respective hyperbolas. Such mapping appropriately corresponds to the beacon of FIG. 2B, in which, as has been discussed, antennas A3 and A4 (shown in dotted lines) may be switchably activated to provide input with respect to the tag's determination of such coordinate mapping. However, as has also been discussed and as is shown in FIG. 2B, antennas A3 and A4 may be deactivated, such that beacon 30 receives CT transmissions from only antennas A1 and A2. Alternatively, antennas A1 and A2 may be selectively deactivated, such that beacon receives CT transmissions from only antennas A3 and A4. In any case, threshold detector$_{TH}$ 25 of tag 20 may be configured, i.e., selectively programmed, to assess whether the tag 20 has traversed a predetermined threshold within, for example, space 220. Such a portion of that space 220 may be represented by FIG. 2B illustrating a hallway portion 40 with characteristic entry and exit areas 42 and 44, respectively. As another example, a portion of space 220 may be represented by FIG. 2C illustrating a warehouse loading dock 46 separated from an adjoining driveway 48 (whereat a delivery vehicle may be disposed) by a loading dock door 50. Such illustrations as are provided in FIGS. 2B and 2C are intended as non-limiting examples of use case scenarios of threshold detection as may be applicable to space 220, and whereas other spaces and examples are contemplated to be amenable to the manner of detection described herein.

In these regards, it is contemplated that the threshold TH for which detection is sought may, optionally, be defined as an area or position of interest within a given space, such as space 220, and, particularly, such a position of material interest therein, as is illustrated by the hallway 40 of FIG. 2B or loading dock door of FIG. 2C.

As has been described, it may be extremely valuable to be aware of whether an object to be tracked via a tag 20 has, in the case of the assisted living facility described above or in a hospital, for example, traversed an area including a critical point or threshold TH along a hallway 40 like that depicted in FIG. 2B. Value, for example, may lie in knowing whether a resident or patient, respectively, has exceeded facility guidelines as a result of being detected at the aforementioned threshold TH.

Similarly, and with respect to FIG. 2C, it would also be valuable, for economic and other reasons, to know whether particular inventory has been readied and stocked onto an awaiting delivery vehicle in a timely manner, based on whether the inventory has traversed the area of the loading dock door 50 representing a threshold TH. Such knowledge would readily inform a warehouse operator or proprietor of, for instance, available inventory and, also, the ability to meet applicable delivery scheduling.

As such, embodiments herein contemplate disposing the beacon 30 such that antennas of a pair thereof among antennas A1-A4 are disposed both equidistantly from and perpendicular to a given threshold TH, while parallel to a direction crossing the threshold TH and that coincides with the path along which the threshold is traversed by the tag 20. For instance, in the case of FIG. 2B, either antenna pair A1-A2 or pair A3-A4 may be disposed parallel to the straight-line path between the entry 42 and the exit 44, such that the separation s among antennas of each of the pairs is bisected by the threshold TH. In the case of FIG. 2C, antennas of antenna pair A1-A2 may be disposed on either side of loading dock door 50, such that their separation s is bisected by the loading dock door 50 threshold TH.

Through operation of the threshold detector$_{TH}$ 25, as discussed below with reference to FIGS. 6-7C, the tag 20 may detect whether it has traversed the threshold TH based on a corresponding PLD among CT transmission of antennas disposed relative to the threshold TH.

Figure 6A:
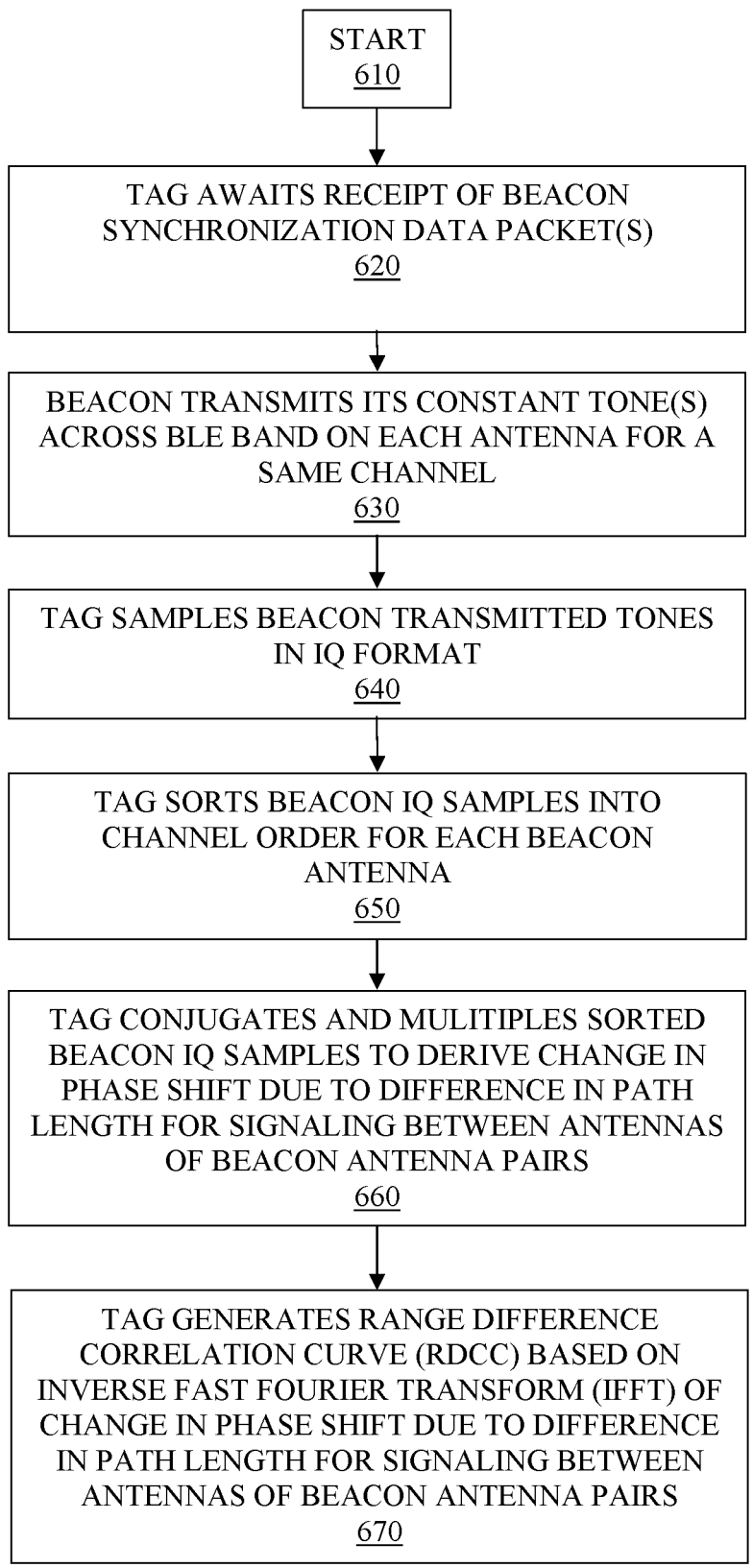
FIGS. 6A and 6B are sequence diagrams illustrating a manner in which the tag determines (a) whether the tag has traversed a threshold relative to the range difference correlation according to FIG. 3 and (b) its coordinate location within a given space in response to receipt of beacon advertisement messages from a beacon configured to transmit such messages from the plurality of antennas according to, for example, either FIG. 2B or FIG. 2C.
Figure 6B:
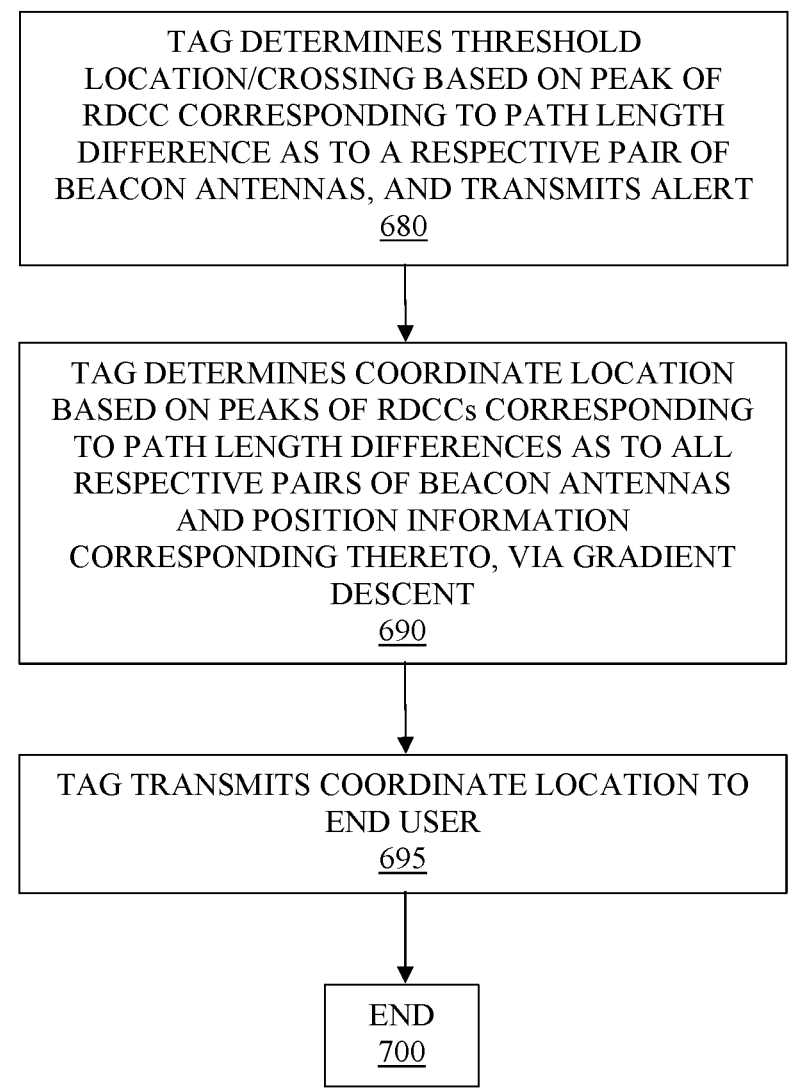

In referring to FIG. 6, there is illustrated a high-level sequence diagram setting forth a manner of interaction between the tag 20 and beacon 30 relative to signaling from each of the beacon's antennas A1 through A4. As will be understood, although only one tag 20 and beacon 30 are described, multiple pairs thereof may be applicable and interact with each other similarly, as described herein. Furthermore, it will also be understood that any one or more of beacons 30 may comprise more or less than the plurality of four (4) antennas described herein.

Thus, the interaction may start at 610 and proceed as at 620 whereat the tag 20 awaits receipt of one or more synchronization data packets from beacon 30 for purposes already described hereinabove. Once synchronized, the tag 20 hops with the beacon 30 across the BLE band as, at 630, the beacon 30 transmits its continuous wave tones, or CTs, in which each tone is received by the tag 20 from each of the beacon 30 antennas for a same channel of the BLE band. As has been discussed above, the tag 20 may be configured to transmit its CTs from one or more pairs of antennas A1-A4. In this way, the beacon 30 accomplishes duplicate transmission of a single, same CT for the same channel, via transmission from each of antennas of any one of pairs of antennas among A1-A4. As such, the tag 20 is then equipped to, at 640, sample the CTs for each channel of the BLE band in IQ format, and then sorts and stores, at 650, the samples in channel order for each antenna.

Based upon the aforementioned IQ samples, the tag 20 proceeds, at 660, to compare those samples. More particularly, the tag 20 compares IQ samples based on signaling from each of pairs of antennas A1 through A4 for each of the channels of the BLE band. To do so, the tag 20 conjugates and multiplies the sorted beacon IQ samples as between respective pairs of antennas to determine phase shift resulting from a difference in RF path length of signaling between respective antennas of each pair thereof. At 670, and based upon an IFFT for signaling from each of a respective pair of antennas across the BLE band, the tag 20 generates a range difference correlation curve RDCC to correlate the magnitude of the change in calculated phase shift PS at each channel of the BLE band to a physical difference in the signaling path lengths, or PLD, of each respective antenna pair to the tag 20. As has been discussed, the correlated magnitude may be derived from the peak p of the IFFT generated by the tag 20 in response to the calculation of the aforementioned phase shift PS. In this way, the tag 20 may analogize conventional TDOA analysis to that of path difference of arrival, or PDOA. Based upon this analogy and since antennas of a given pair thereof may be disposed equidistantly on either side of a desired threshold TH to be measured/observed, the tag 20 may determine, at 680, its location and/or traversal relative to the threshold TH. Such determination of traversal results from the tag's assessment and observation of a correlation of the peak p of the RDCC to a PLD of zero thereof as the tag 20 traverses a given threshold TH of interest. Upon such determination, the tag 20 may generate or transmit an alert, such as a message signaling traversal of the threshold TH to an end user via, for example, an AP 40. Additionally, the tag 20 may be configured to generate an alert locally at the tag 20, wherein such alert may include a message and/or an audible or other sensory indication, including a beep or vibration. Further, one or more of the message, audible or other sensory indication may be generated both locally at the tag 20 and/or away from the tag 20.

With the above correlations for beacon antenna signaling across each channel of the BLE band, the tag may then, at 690, determine its coordinate location based on the peaks p of each of its generated RDCCs and the respective position data corresponding to each transmitting beacon 30 antenna. In particular, the tag 20 undertakes such determination by refining its mean estimate, i.e., its rough coordinate location calculated according to the quotient of the summed antenna coordinates and respective number of antennas, via gradient descent to minimize a cost of error with respect to the determination of a given path length difference (PLD) as between a pair of antennas. That is, the tag 20 may minimize the cost of error that a respective path length difference PLD for a given pair of a plurality of antennas correlates to a given shift in phase for transmissions from antennas of said given pair to the tag 20.

In this regard, the tag 20 may execute the below gradient descent analysis for each determined path length difference PDL so as to iteratively refine its mean estimate of its coordinate location with respect to coordinate locations of one or more of the antennas from which it had received a beacon advertisement message, in which:

$$\vec{g} = -2\alpha \times (n_i - n_j - d_{ij}) \times \left( \frac{\hat{x} - \hat{a}_i}{n_i} - \frac{\hat{x} - \hat{a}_j}{n_j} \right),$$

wherein:

$\vec{g}$ represents a vector disposed in the direction of least squared error;
$\hat{x}$ represents the current tag location estimate;
$\alpha$ represents an empirically chosen descent scaling factor;
$\hat{a}_i$ represents the coordinate location of the $i^{th}$ transmitting antenna;
$\hat{a}_j$ represents the coordinate location of the $j^{th}$ transmitting antenna;
$d_{ij}$ represents the path length difference (PLD) between $\hat{a}_i$ and $\hat{a}_j$ as measured by the tag;
$n_i$ represents the calculated Euclidean distance from $\hat{a}_i$ to $\hat{x}$; and
$n_j$ represents the calculated Euclidean distance from $\hat{a}_j$ to $\hat{x}$.

In determining the vector $\vec{g}$, the tag 20 minimizes the cost of error associated with determination of the true path length difference PLD as between respective pairs of antennas according to the function below, in which:

$$\varepsilon = \left( \sqrt{\hat{x}^2 - \hat{a}_i^2} - \sqrt{\hat{x}^2 - \hat{a}_j^2} - d_{ij} \right)^2,$$

wherein:

$\varepsilon$ represents the squared error at $\hat{x}$;
$\hat{x}$ represents the current tag location estimate;
$d_{ij}$ represents the path length difference between $\hat{a}_i$ and $\hat{a}_j$ as measured by the tag;
$\hat{a}_i$ represents the coordinate location of the $i^{th}$ transmitting antenna; and
$\hat{a}_j$ represents the coordinate location of the $j^{th}$ transmitting antenna.

In these ways, the tag 20 may iteratively assess the phase shift PS resulting from differences in path lengths of antenna transmissions, and based on the assessment(s), continually update its coordinate location by refining its initially determined location estimate.

Furthermore, it is contemplated that when determining the vector g, the tag 20 may be configured to restrict a given path length difference PLD to be within a range of peaks p delineating threshold limits within a particular antenna separation s of any one or more given RDCCs. In other words, in a case involving an inquiry as to whether the tag is positioned at a certain location or not, such range of peaks may be selected as being respectively bounded by first and last peaks within the separation distance s. In this way, and based upon the inquiry, determination of the vector $\vec{g}$ for each peak p will yield a solution to the inquiry, as a result of a comparison of resulting coordinate locations at each peak p.

At 695, the tag 20 may then transmit its coordinate location, and any other contained information thereof such as sensory and/or logistical, inventory, and/or inventoried data, to an end user via an access point 40 or through use of its own backhaul, prior to ending processing thereby at 700.

Figure 7A:
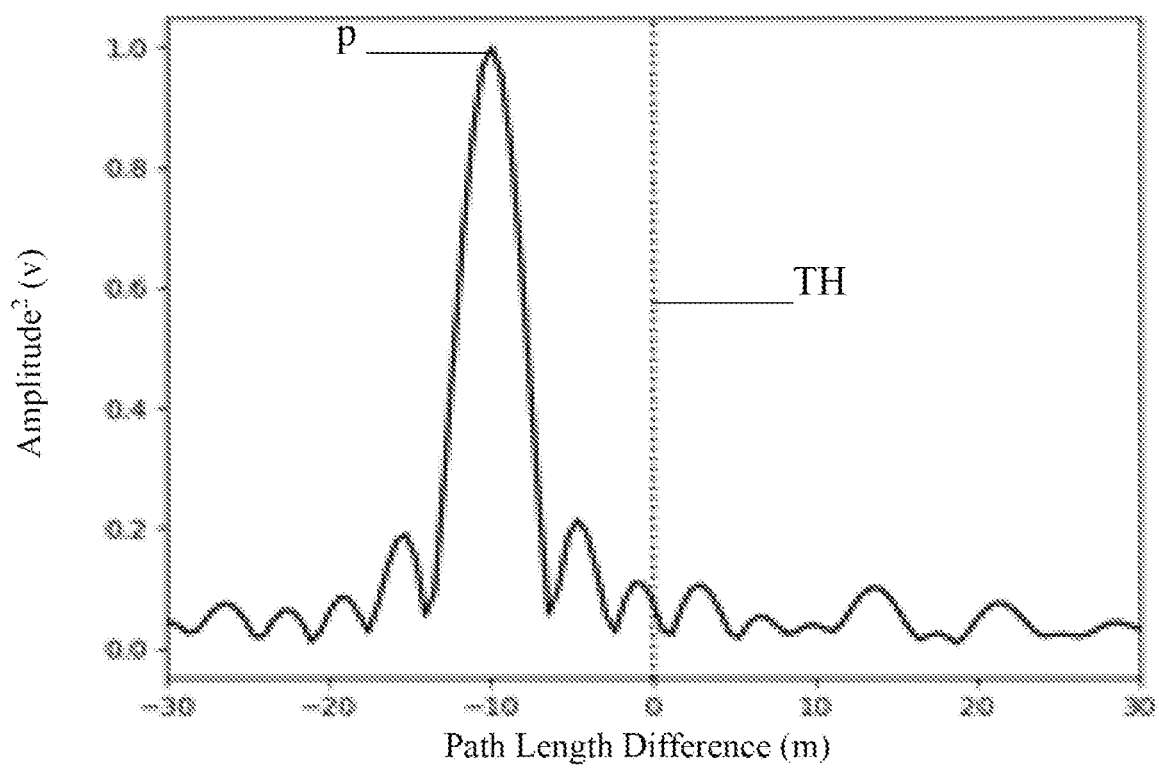
FIGS. 7A, 7B, and 7C are schematic diagrams illustrating determination by a tag, according to the range difference correlation according to FIG. 3, for example, as to the relative positioning of the tag with respect to a threshold applicable to a given space.
Figure 7A:
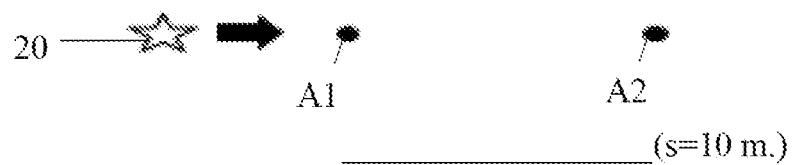
Figure 7B:
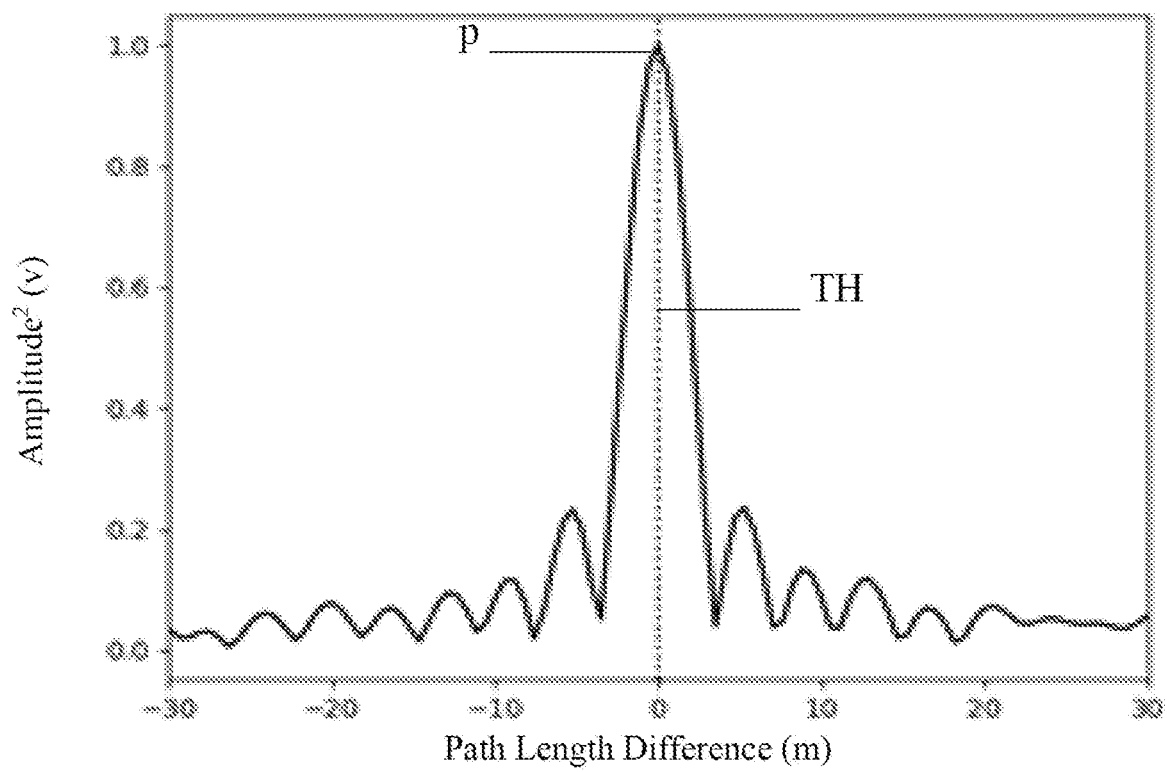
Figure 7B:
Figure 7C:
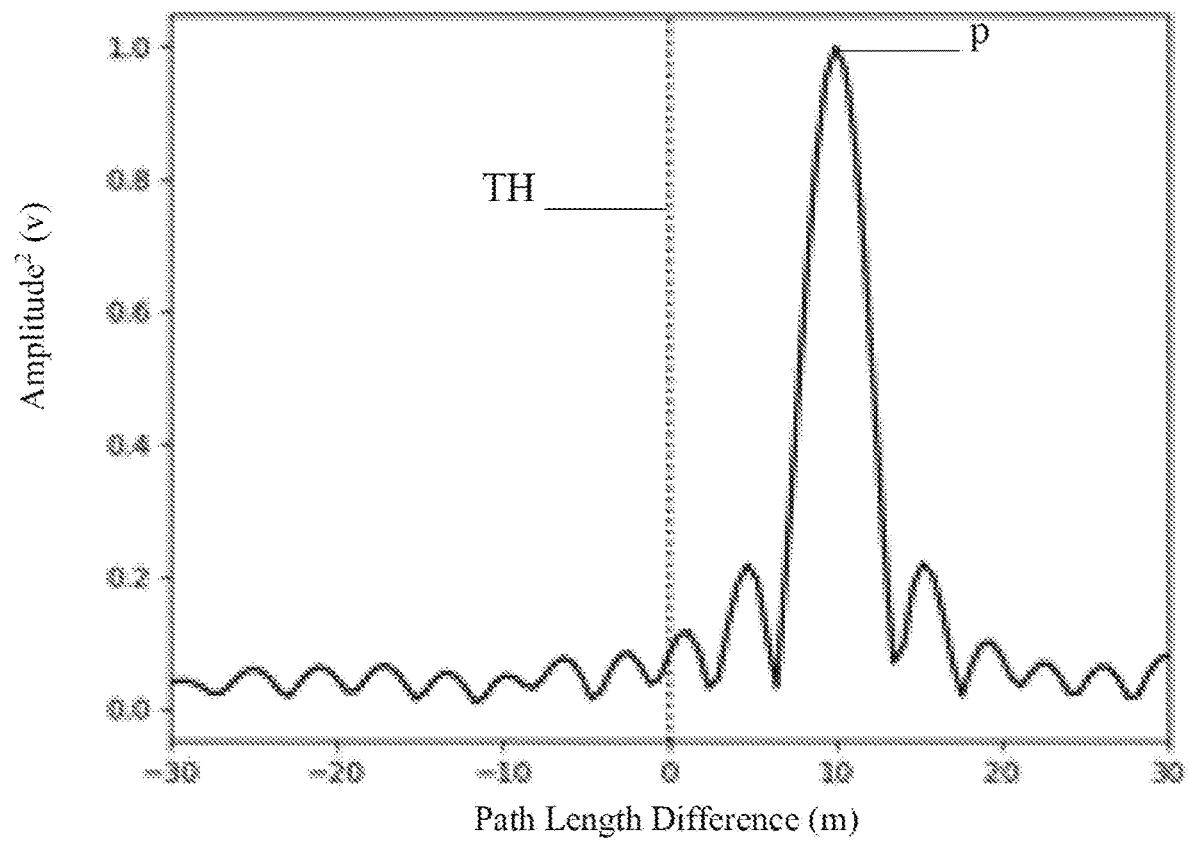
Figure 7C:
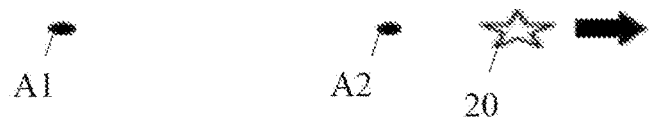

Referring to FIGS. 7A-7C, there is illustrated an exemplary progression (→) of the traversal of tag 20 (as depicted by the star therein) relative to the exemplary hallway threshold TH of FIG. 2B. Throughout, exemplary antennas, such as antennas A1 and A2 are depicted via the black dots therein.

Throughout FIGS. 7A-7C and for an exemplary antenna separation s of 10 m, the threshold TH coincides with a separation distance of 5 m, and, as will be understood, a PLD as to respective antennas of zero. In this regard, the predetermined antenna separation s is arbitrary and may be selected to conform to an area configuration of space 220 that accommodates an appropriate disposition of antennas relative to the interested threshold TH. In other words, antennas of a given antenna pair may be disposed relative to the threshold TH of interest at any given points along a path containing the threshold TH so long as the space 220 may accommodate such disposition.

In FIG. 7A, for instance, the span of the illustrated PLD may represent only a portion of the true length of the hallway along which the threshold TH is disposed. The same applies to FIGS. 7B and 7C.

Threshold detector$_{TH}$ 25 operates to detect the threshold TH via coincidence of the peak p of the RDCC, as generated by the tag 20 for PLDs between antennas of a respective pair thereof, with a PLD of zero. In other words, a PLD of zero is indicative that transmissions from each of the antennas are equidistant, and therefore, that the tag 20 is equidistant from such antennas. In this way, embodiments herein demonstrate the flexibility by which to observe traversal of the threshold TH by the tag 20 simply based on disposition of respective antennas of a pair thereof relative to the threshold TH. Traversal of the threshold TH may therefore be understood as the correlation of a highest magnitude of correspondence between shifts in phase of transmissions of the antennas, i.e., a respective peak p as shown in FIGS. 7A-7C, to a PLD of zero. That is, the traversal may be detected by the tag 20 and based solely on a shift in the correlation of its observed peak p to a PLD of zero corresponding to the crossover between negative and positive PLDs. Such traversal may be realized by disposing each antenna on either side of the threshold TH and at a distance equal to one-half the antenna separation s.

To illustrate, FIG. 7A depicts the tag's observance of the peak p at roughly −10 m, or 10 m to the left of the threshold TH. In this regard, and with reference to the assisted living facility discussion above in which a resident may carry tag 20, the resident may be acting within facility guidelines wherein, for example, the resident is deemed to be safely distanced from his or her living quarters since he or she has not reached the threshold TH. FIG. 7B depicts the tag's observance of the coincidence of the peak p with a PLD of zero so as to be indicative that the tag 20 has arrived at the threshold TH. Here, and again referring to the assessment of the resident's travel, tag 20 may cause an alert (as described above) to be transmitted to facility staff so that a determination may be made as to whether the resident is acting in accordance with facility guidelines. On the other hand, FIG. 7C depicts the tag's observance that the resident has traversed past the threshold TH, based on peak p correlating to a PLD of about +10 m. In this case, facility staff may be informed, via transmission by the tag 20 of its location, of the need to assist the resident in an appropriate manner.

As will be appreciated, the above observations of tag 20 throughout FIGS. 7A-7C may be equally applicable to determine whether inventory has traversed the threshold TH represented by the loading dock door 50 of FIG. 2C. As such, assessments involving, for example, available inventory, delivery scheduling and/or personnel can be performed.

As will be understood from the above, the tag 20 may operate to expeditiously determine its coordinate location within a given space, and further, may do so with minimal power requirements. Decreased power consumption, when compared with conventional time-based TDOA analysis, results from processing of merely the relative phase shift PS between received signaling, as opposed to the need for continuing TDOA temporal resolution. In other words, the waveform(s) of received signaling of embodiments herein inherently provide the basis of phase-based TDOA framework information that is necessary in order to arrive at the coordinate location of the tag 20, and to determine whether the tag 20 has traversed a given threshold TH. Further, since such waveforms are exclusively transited one way from the beacon 30 to the tag 20, collisions that might otherwise exist are avoided, thus eliminating the need for alternate transmission/receipt schemes at the tag 20 and/or beacon 30. In these ways, the tag 20 may be otherwise miniaturized since demands on and for battery capacity and consumption may be decreased.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A system, comprising:
at least one tag; and
at least one beacon,
wherein
   said at least one tag and said at least one beacon are configured to engage in wireless communications in a given space and across channels of a given frequency band,
   in which said at least one beacon only transmits each of transmissions of at least one Constant Tone (CT) on a same channel, and for each of said channels, for receipt by said at least one tag,
   in response to said receipt of said transmissions of said at least one CT, said at least one tag is configured to determine one or more shifts in phase corresponding to said transmissions, which are indicative of a proximity of said at least one tag relative to a predetermined threshold disposed within said given space,
   said at least one beacon comprises at least a first pair of spaced antennas each configured to transmit a respective transmission of said transmissions of said at least one CT, and
   said antennas of said at least a first pair of antennas are disposed substantially perpendicular to said predetermined threshold, and spaced from each other at a separation distance bisected by said predetermined threshold.

2. The system of claim 1, wherein:
said one or more shifts in phase correspond to a path length difference (PLD) as between transmissions of said at least one CT received by said at least one tag for said channels of said given frequency band.

3. The system of claim 2, wherein:
correlation of a highest magnitude phase shift to a PLD of zero represents a traversal of said at least one tag across said predetermined threshold causing the tag to generate an alert indicative of said traversal.

4. The system of claim 3, wherein:
said at least one CT is transmitted by each antenna of said at least a first pair of antennas on said same channel.

5. The system of claim 4, wherein:
said at least one tag is configured to determine, based upon (a) coordinate data of said at least a first pair of antennas transmitted by said at least one beacon to and received by said at least one tag, and (b) a PLD at said highest phase shift magnitude as between said transmissions of said at least one CT transmitted by said at least a first pair of antennas, a coordinate location of said at least one tag within said given space.

6. The system of claim 5, wherein:
said at least one beacon further comprises at least a second pair of spaced antennas each configured to transmit to said at least one tag said at least one CT on said same channel and for each of said channels.

7. The system of claim 6, wherein:
said at least one tag is configured to determine, based upon (a) said coordinate data of said at least a first pair of antennas, (b) coordinate data of said at least a second pair of antennas transmitted by said at least one beacon to and received by said at least one tag, and (c) said PLD at said highest phase shift magnitude and a PLD at a highest phase shift magnitude corresponding to said transmissions by said at least a second pair of antennas of said at least one CT, said coordinate location of said at least one tag within said given space.

8. The system of claim 7, wherein:
said at least a second pair of antennas is configured to be selectively deactivated.

9. A method, comprising:
disposing at least one tag in a given space; and
disposing at least one beacon in said given space,
wherein
   said at least one tag and said at least one beacon are configured to engage in wireless communications in a given space and across channels of a given frequency band,
   in which said at least one beacon only transmits each of transmissions of at least one Constant Tone (CT) on a same channel, and for each of said channels, for receipt by said at least one tag,
   in response to said receipt of said transmissions of said at least one CT, said at least one tag is configured to determine one or more shifts in phase corresponding to said transmissions, which are indicative of a proximity of said at least one tag relative to a predetermined threshold disposed within said given space,
   said at least one beacon comprises at least a first pair of spaced antennas each configured to transmit a respective transmission of said transmissions of said at least one CT, and
   said antennas of said at least a first pair of antennas are disposed substantially perpendicular to said predetermined threshold, and spaced from each other at a separation distance bisected by said predetermined threshold.

10. The method of claim 9, wherein:
said one or more shifts in phase correspond to a path length difference (PLD) as between transmissions of said at least one CT received by said at least one tag for said channels of said given frequency band.

11. The method of claim 10, wherein:
correlation of a highest magnitude phase shift to a PLD of zero represents traversal of said at least one tag across said predetermined threshold causing the tag to generate an alert indicative of said traversal.

12. The method of claim 11, wherein:
said at least one CT is transmitted by each antenna of said at least a first pair of antennas on said same channel.

13. The method of claim 12, further comprising:
determining, at said at least one tag and based upon (a) coordinate data of said at least a first pair of antennas transmitted by said at least one beacon to and received by said at least one tag, and (b) a PLD at said highest phase shift magnitude as between said transmissions of said at least one CT transmitted by said at least a first pair of antennas, a coordinate location of said at least one tag within said given space.

14. The method of claim 13, wherein:

said at least one beacon further comprises at least a second pair of spaced antennas each configured to transmit to said at least one tag said at least one CT on said same channel and for each of said channels.

15. The method of claim 14, further comprising:

determining, at said at least one tag and based upon (a) said coordinate data of said at least a first pair of antennas, (b) coordinate data of said at least a second pair of antennas transmitted by said at least one beacon to and received by said at least one tag, and (c) said PLD at said highest phase shift magnitude and a PLD at a highest phase shift magnitude corresponding to said transmissions by said at least a second pair of antennas of said at least one CT, said coordinate location of said at least one tag within said given space.

16. The method of claim 15, wherein:

said at least a second pair of antennas is configured to be selectively deactivated.

\* \* \* \* \*